United States Patent
Nagura

(10) Patent No.: US 8,451,732 B2
(45) Date of Patent: May 28, 2013

(54) INTER-VEHICLE COMMUNICATION APPARATUS AND METHOD CAPABLE OF DETECTING PACKET COLLISION

(75) Inventor: Michinaga Nagura, Kariya (JP)

(73) Assignee: Denso Corporation, Kariya (JP)

(*) Notice: Subject to any disclaimer, the term of this patent is extended or adjusted under 35 U.S.C. 154(b) by 323 days.

(21) Appl. No.: 12/924,482

(22) Filed: Sep. 28, 2010

(65) Prior Publication Data

US 2011/0019577 A1    Jan. 27, 2011

Related U.S. Application Data

(63) Continuation of application No. 11/891,172, filed on Aug. 9, 2007, now Pat. No. 7,835,396.

(30) Foreign Application Priority Data

Aug. 9, 2006    (JP) .................. 2006-216998

(51) Int. Cl.
    *H04L 12/26*    (2006.01)
(52) U.S. Cl.
    USPC ......................................................... 370/235
(58) Field of Classification Search
    None
    See application file for complete search history.

(56) References Cited

U.S. PATENT DOCUMENTS

| | | | |
|---|---|---|---|
| 5,307,509 A | 4/1994 | Michalon et al. | |
| 5,875,183 A | 2/1999 | Nitadori | |
| 6,449,282 B1* | 9/2002 | Loher | 370/447 |
| 7,835,396 B2* | 11/2010 | Nagura | 370/468 |
| 2004/0264425 A1* | 12/2004 | Nishikawa | 370/338 |
| 2005/0232224 A1 | 10/2005 | Beischner et al. | |
| 2008/0273525 A1* | 11/2008 | Sakoda | 370/352 |
| 2011/0310733 A1* | 12/2011 | Tzamaloukas et al. | 370/230 |

FOREIGN PATENT DOCUMENTS

| | | |
|---|---|---|
| EP | 0 097 309 | 11/1987 |
| JP | 4-273635 | 9/1992 |
| JP | 07-030964 | 1/1995 |
| JP | 9-191286 | 7/1997 |
| JP | 2002-111677 | 4/2002 |
| JP | 2003-258715 | 9/2003 |
| JP | 2004-274321 | 9/2004 |
| JP | 2004-343407 | 12/2004 |
| JP | 2005-236362 | 9/2005 |
| JP | 2006-049972 | 2/2006 |
| JP | 2006-065667 | 3/2006 |

OTHER PUBLICATIONS

Office Action dated Oct. 12, 2010 in corresponding Japanese Application No. 2006-216998 with English translation thereof.
Decision of Rejection dated Jan. 25, 2011 in corresponding JP Application No. 2006-216998 with English translation.
Office Action dated Feb. 9, 2012 in corresponding German patent application No. 10 2007 037 640.7 with English translation thereof.
Office Action dated Apr. 8, 2009 in German Application No. 10 2007 037 640.7 with English translation.
Young-An, Kim et al, "R-Aloha Protocol for SS Inter-Vehicle Communication Network Using Head Spacing Information", IEEE, 1996.

* cited by examiner

*Primary Examiner* — Anh-Vu Ly
(74) *Attorney, Agent, or Firm* — Harness, Dickey & Pierce, PLC

(57) ABSTRACT

In inter-vehicle communication, a communication apparatus may not normally receive a packet having a sufficient reception power level. Under such circumstances, a control circuit in the apparatus determines that the received packet has collided with other packet if a condition is met that a time period for a receiver circuit to receive a packet having a reception power level of equal to or more than a set value is longer than a time period required for the receiver circuit to receive a packet having a predetermined packet length.

10 Claims, 6 Drawing Sheets

| HEADER | ID INFORMATION | LOCATION INFORMATION | VEHICLE INFORMATION | COLLISION DETECTION INFORMATION | TRANSMISSION TIME INFORMATION | OTHER INFORMATION | FOOTER |
|---|---|---|---|---|---|---|---|

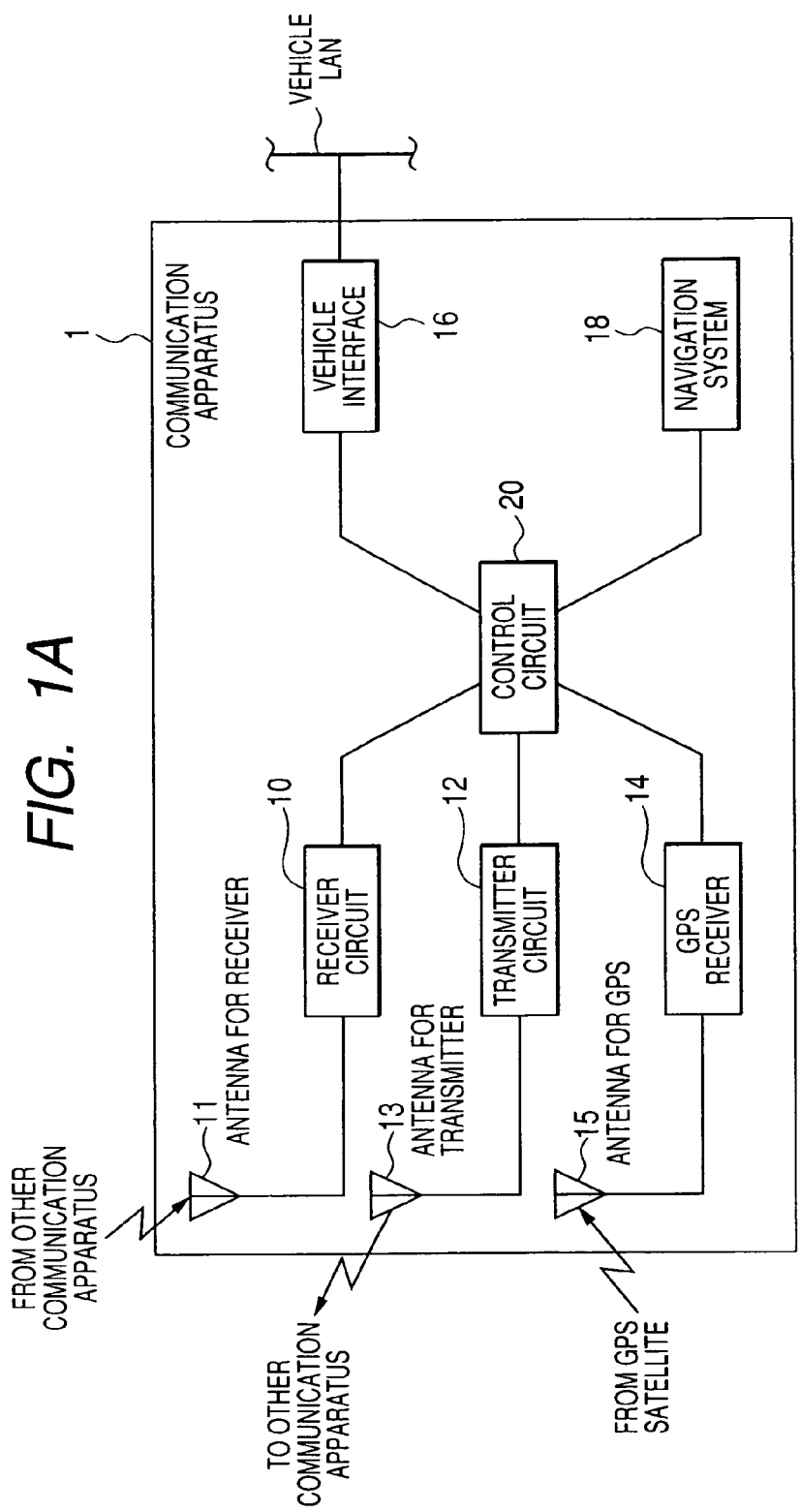

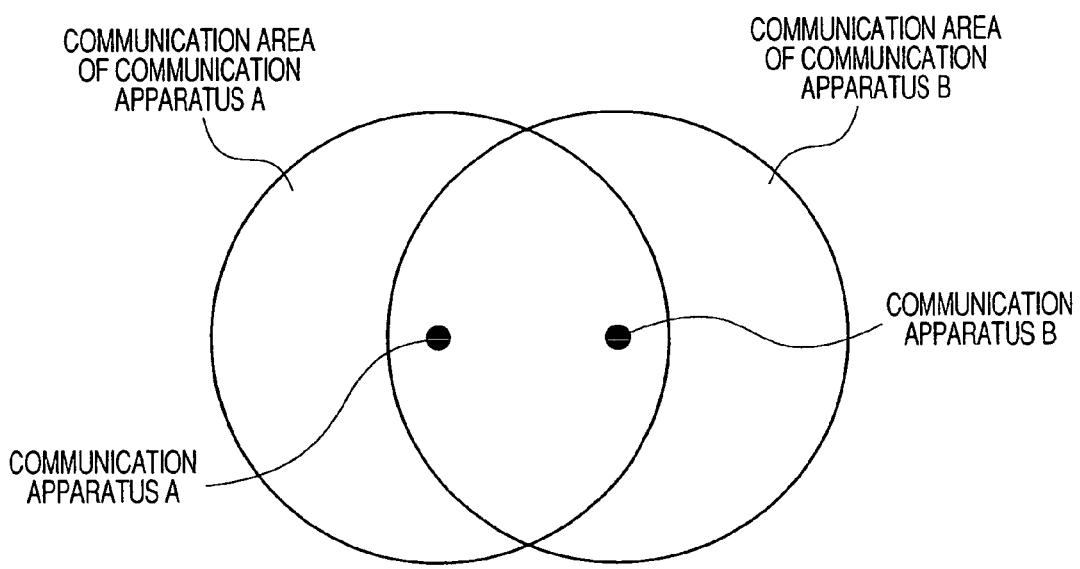
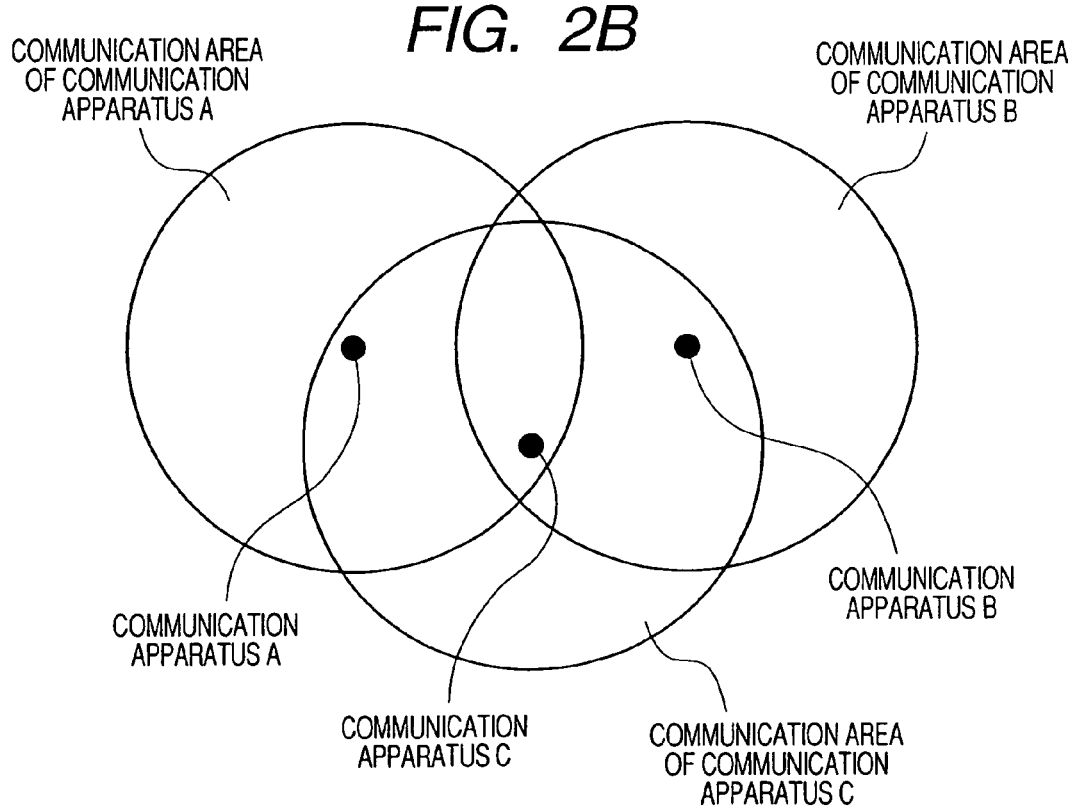

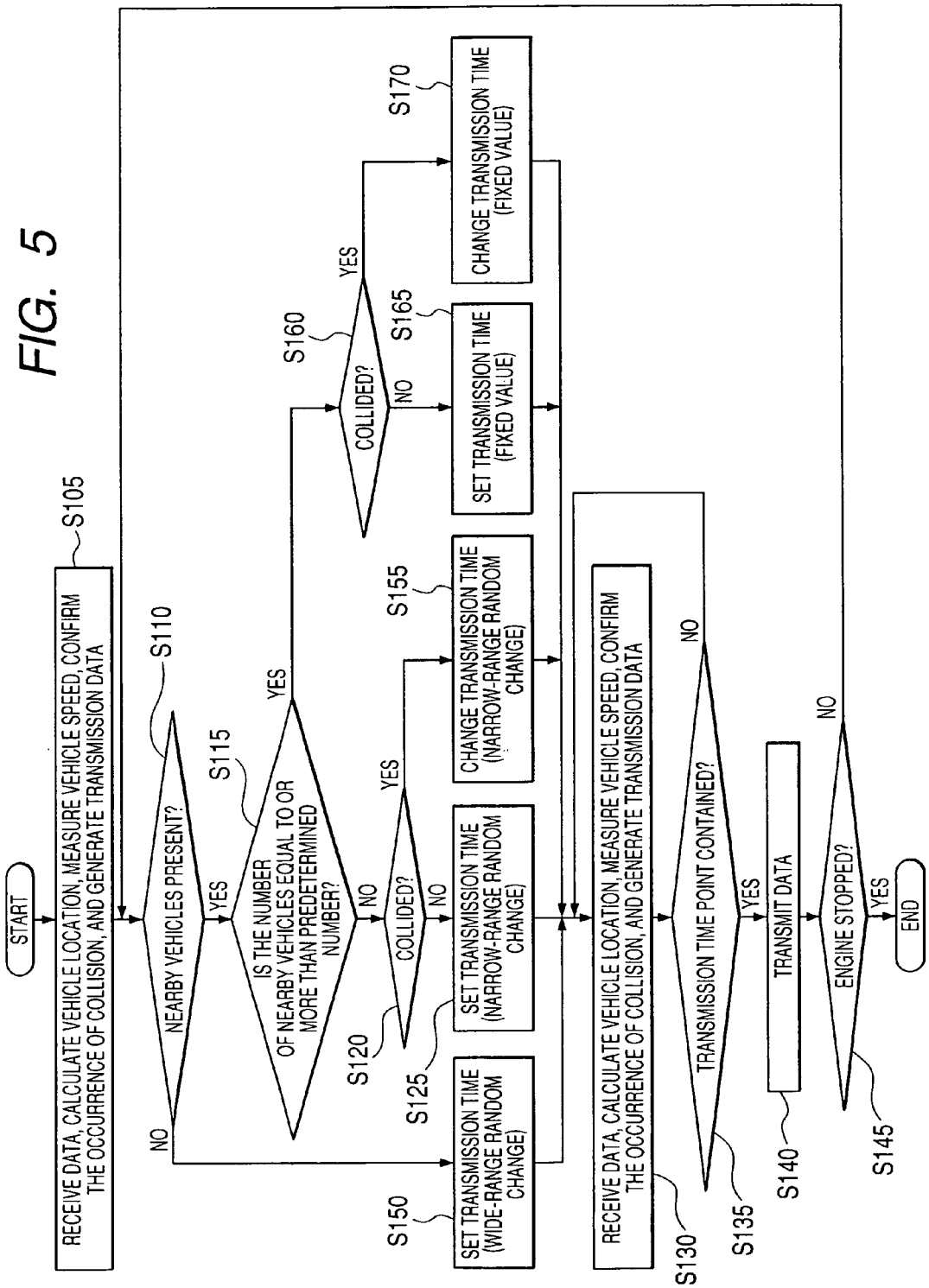

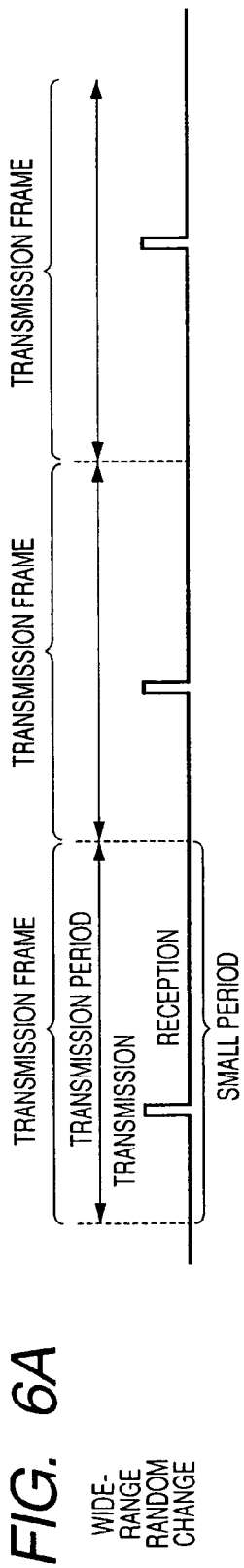
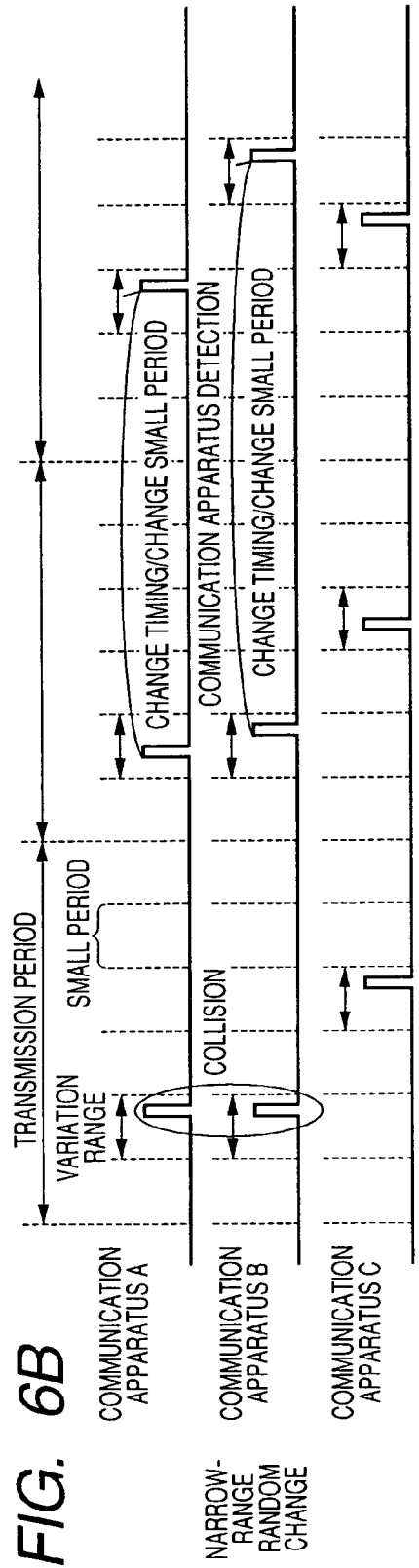
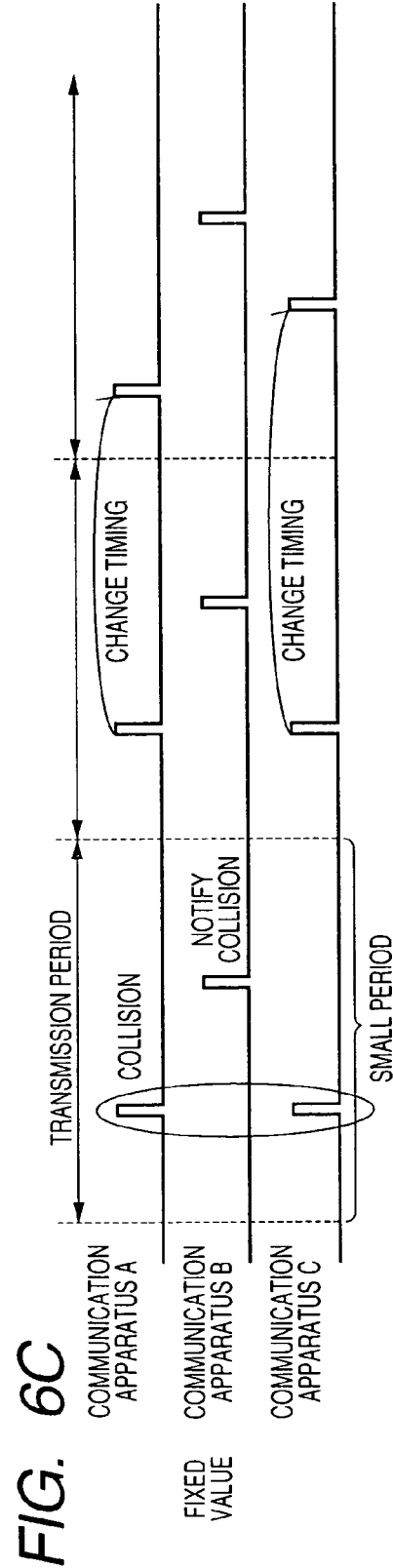

INTER-VEHICLE COMMUNICATION APPARATUS AND METHOD CAPABLE OF DETECTING PACKET COLLISION

CROSS-REFERENCE TO RELATED APPLICATION

This application is a continuation of U.S. Ser. No. 11/891,172 filed Aug. 9, 2007 now U.S. Pat. No. 7,835,396. This application is based on and claims the benefit of priority from earlier Japanese Patent Application No. 2006-216998 filed Aug. 9, 2006, the description of which is incorporated herein by reference.

BACKGROUND OF THE INVENTION

1. Field of the Invention

The present invention relates to an apparatus and method for making inter-vehicle communication, which enables an inter-vehicle communication apparatus that has transmitted a data packet to detect collision of the data packet with other data packets transmitted from other inter-vehicle communication apparatus.

2. Description of the Related Art

Inter-vehicle communication apparatus have been known which are mounted in vehicles to make communication between vehicles. For example, Japanese Patent Application Laid-Open No. 2003-258715 discloses an inter-vehicle communication apparatus for vehicles, which is adapted to detect the number of vehicles around the vehicle of its own, randomly determine a transmission interval based on the number of the vehicles and transmit a frame containing vehicle information at the determined interval. Also, such an inter-vehicle communication apparatus is adapted to randomly determine a transmission interval based on a travel speed corresponding to the externally inputted travel speed information of the vehicle of its own, and transmit a frame containing the vehicle information at the determined transmission interval. In this way, the collision frequency between communication packets is believed to be reduced and to enhance the communication efficiency.

However, in an inter-vehicle communication apparatus, as mentioned above, for use in wireless communication between vehicles, the vehicle, per se, that has transmitted a communication packet cannot know the fact of the occurrence of collision. As a measure for this, inter-vehicle communication apparatus are allowed to transmit/receive response signals (i.e., acknowledgement, which is hereinafter referred to as ACK) between them, which signals indicate normal reception of the communication packet. In this way, a vehicle can indirectly detect the occurrence of the collision between communication packets. If a collision has occurred, for example, the communication packet in question can be retransmitted as required. It should be appreciated that, in case of so-called one-on-one communication, a communication link established in advance may enable designation of other vehicles to communicate with. In this case, since the inter-vehicle communication apparatus of those vehicles which have not been designated may never respond, no collision may occur between communication packets.

Taking an example, an explanation will be provided below on a method for providing a location of a vehicle of interest. Two methods can be cited as the methods for providing a location of the vehicle of interest. One method is performed by making transmission in response to an interrogation from the other vehicle or a roadside machine, and the other method is performed by making transmission on a periodic basis.

The former method of responding to an interrogation limits a communication area and is effective where there are only a few vehicles in the communication area. When several hundreds of vehicles are in the communication area, such as in a traffic jam, these vehicles may respond to the interrogation all at once. Collision between response packets therefore is unavoidable and thus no normal communication can be expected. For this reason, it is preferable that transmission of the information on the vehicle location may be periodically performed and that the nearby vehicles may receive and utilize the information.

In one particular example, time required for transmission per packet is set as being 1 millisecond and the transmission period is changed between traffic-jam traveling and high-speed traveling, so that the packet density can be controlled so as not to be exceedingly high. For example, the time required for transmission per packet may be set at one second in traffic-jam traveling and 100 milliseconds for high-speed traveling. This may enable communication with a maximum of 1000 vehicles in the communication area in a traffic-jam and maximum of 100 vehicles in high-speed traveling.

The inter-vehicle communication apparatus used for inter-vehicle wireless communication described above, however, may establish a one-way communication mode, one application of the inter-vehicle communication, such as the case of notifying a location of the vehicle of interest, in which no response (ACK) as mentioned above may be made. It has thus been a problem that, under such circumstances, difficulty arises in determining the occurrence of collision between communication packets.

SUMMARY OF THE INVENTION

The present invention has been made in light of the problem mentioned above, and has as its object to provide an apparatus and method for inter-vehicle communication. More particularly, the present invention has an object of providing an apparatus and method for inter-vehicle communication, which is able to readily determine the occurrence of collision between packets in a one-way communication mode that performs no reception/transmission of a response signal (ACK) indicative of normal reception of a communication packet.

The inter-vehicle communication apparatus and method, provided for solving the problem mentioned above is made up of a plurality of inter-vehicle communication apparatuses (hereinafter referred to just as communication apparatus(es)) which are mounted in other vehicles respectively. Each communication apparatus includes communicating means, communication controlling means and collision determining means, which are for making communication with a communication apparatus mounted in each of the nearby vehicles. The communication controlling means controls the communicating means and transmits information to other communication apparatus, in the forms of one or more packets. At the same time, the communication control means controls the communicating means and receives the information in the forms of one or more packets, which are transmitted from other communication apparatus. When the communication control means has received a packet transmitted from other communication apparatus, the collision determining means determines whether or not the packets sent from the other communication apparatus and received packet has collided with each other.

According to the present invention, the occurrence of collision between packets can be readily determined in the course of the inter-vehicle communication.

The collision determining means determines a received packet as having collided with another packet when it takes a longer time period for the communication control means to receive the packet of predetermined packet length transmitted from other communication apparatus.

Referring to FIGS. 2A to 4B, a description will now be focused on a method for detecting collision of packets. FIGS. 2A and 2B illustrates a situation where a collision occurs in communication. A term "simultaneous transmission" refers to a state where a part or all of a transmission time period of a so-called packet, or a group of data, overlaps with a transmission time period of another packet. The overlapped time period indicates a state where two radio waves have interfered with each other and normal reception is being disabled. Data transmission is typically carried out utilizing packets. Accordingly, breaking a partial data in a packet can lead to breaking the whole packet. Generally, a code, or a flag, is attached to the top of a packet and an error detection code is attached to the end of the packet. A packet in interference may not even cause a reception error and may possibly be decoded. In this case, since the data, per se, will be corrupted, the error detection code may work to notify the collision.

Also, the receiving field intensity of a packet being interfered with another packet may exceed receiver sensitivity over a section longer than a normal packet length. Thus, measurement of the reception time period may also enable detection of the collision. In case of wireless communication, however, the collision cannot be detected by the communication apparatus transmitting the packet. Thus, once transmission is started in wireless communication, the transmission is continued to the end, involving time-lag which may elongate the reception time period. FIG. 3C shows a case where there is not so much difference between the field intensities. Depending on a difference in a distance, for example, a large difference may be caused between the field intensities. In this case, decoding is possible for the radio wave having a higher field intensity.

FIG. 4A shows an example, in which a strong radio wave comes after a weak radio wave. A weak radio wave, if it has higher intensity than the receiver sensitivity, may be receivable. However, once a strong radio wave is subsequently received, the weak radio wave is ignored and decoding of the strong radio wave is started. At this point, the packet having the weak radio wave, whose reception has been started by then, may result in an error. The possibility of receiving strong radio waves depends on the communication method. A reception mode, once effective, is continued for the length of the packet. Under the condition where a determination is made as to the normality of the reception based on an error code, the subsequent packet having the strong radio wave cannot be received. An error may be detected by some means in the course of the reception continued for the length of a packet and the reception may then be resumed. Using this scheme, the subsequent strong radio wave can be received. FIG. 4B shows an example, in which a strong radio wave is received first and then a weak radio wave is received. The strong radio wave is continuingly received without being affected by the weak radio wave, for completion of the reception in a normal manner. Under the influence of the strong radio wave, the weak radio wave may not be received in a normal manner.

In both of the cases, the reception time period longer than the normal packet length may enable detection of the collision that has occurred. The field intensity in general is weakened in inverse proportion to a squared distance. Accordingly, drowning out of the weak radio wave by the strong radio wave may not be a problem because information from a communication apparatus which is estimated to be located nearer can be received.

As described above, according to the present invention, collision between packets is estimated as having occurred in case normal reception has not been made by other communication apparatus, in spite of the fact that the packet concerned has sufficient reception power level.

Paying attention to this point, when the time period is longer than the packet length, when receiving a packet having a reception power level equal to or more than a set value, the packet is determined as having collided with other packet. In this way, collision between packets can be readily determined as having occurred.

In a communication mode where no response signal indicative of normal reception of a packet is transmitted, a communication apparatus may have difficulty in recognizing the possible collision of the packet the apparatus has transmitted. A possible measure that can be taken for this is to impart the received packet with a piece of information indicative of collision, if detected, for return transmission. Specifically, when the collision determining means determines that a received packet has collided with the other packet, the communication controlling means can impart a piece of information indicating accordingly to the packet to be transmitted. The packet imparted with the information may then be transmitted to other communication apparatus under the control of the communicating means. In this way, the communication apparatus can detect the possible collision of the packet transmitted by itself with other packet in the one-way communication mode where no response (ACK) indicative of normal reception is available.

In addition, when the collision determining means detected a collision of the packets, it is considered to sending at least one packet which contains generated information indicating the collision. Specifically, when the collision determining means determines that a received packet has collided with other packet, the communication controlling means can generate a piece of information indicating accordingly to the packet to be transmitted. The packet imparted with the information may then be transmitted to other communication apparatus as at least one packet under the control of the communicating means. In this way, the communication apparatus can detect the possible collision of the packet transmitted by itself with other packet in the one-way communication mode where no response (ACK) indicative of normal reception is available.

In this case, the information indicating collision is considered to use a slot number. Specifically, when the collision determining means determines that a received packet has collided with other packet, the communication controlling means can use the slot number or a bit location corresponding to the slot position accordingly to the packet to be transmitted. The slot number is a number allotted to the communication apparatus and used for periodic transmission in a communication system. This number is allotted to the communication apparatus when the communication apparatus found an unused slot where no vehicles used thereof and no collision occurred. And the bit location indicates a position in a transmitting period which is divided into number of slots. For example, a transmitting period of one second is divided into 1000 slots (one millisecond period for each slot). Total 1000 bits are assigned to indicate each slot location so that each slot has a bit number corresponding to slot number. The bit number can be used to indicate whether collision occurred or not using a bit value, which is "one" or "zero".

BRIEF DESCRIPTION OF THE DRAWINGS

In the drawings:

FIG. 1A is a block diagram illustrating a configuration of a communication apparatus according to an embodiment of the present invention;

FIG. 1B is a diagrammatic illustration showing a structure of a packet;

FIG. 2A is a diagrammatic illustration showing communication areas of communication apparatuses A and B;

FIG. 2B is a diagrammatic illustration showing communication areas of on-vehicle machines A, B and C;

FIG. 5 is a flow diagram illustrating a communication control routine executed by a control circuit in the communication apparatus; and FIGS. 6A to 6C are timing diagrams illustrating the communication control routine executed by the control circuit in the communication apparatus.

DESCRIPTION OF THE PREFERRED EMBODIMENTS

Figure 3A:
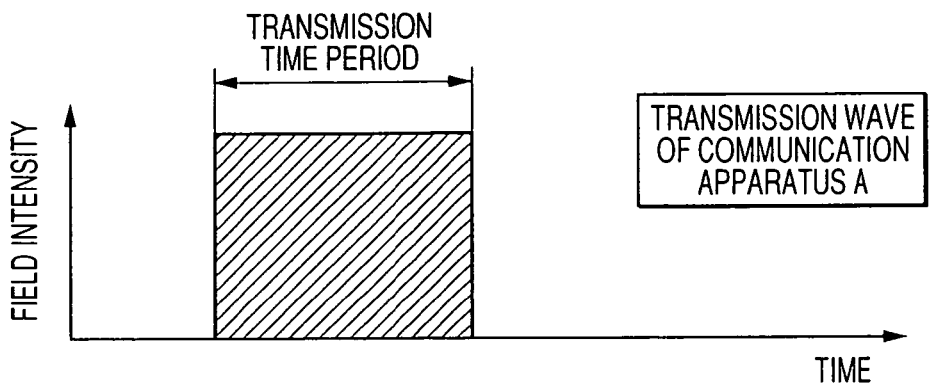
FIG. 3A is a diagrammatic illustration showing a transmission wave of the communication apparatus A.

With reference to the accompanying drawings, hereinafter will be described an embodiment of the present invention.

FIG. 1A is a block diagram illustrating a configuration of a communication apparatus according to an embodiment of the present invention. FIG. 1B is a diagrammatic illustration showing a structure of a packet.

[Configuration of the Communication Apparatus 1]

As shown in FIG. 1A, the communication apparatus 1 includes a receiver circuit 10, a transmitter circuit 12, a GPS receiver 14, a vehicle interface 16, a navigation system 18 and a control circuit 20. The receiver circuit 10, the transmitter circuit 12, the GPS receiver 14, the vehicle interface 16 and the navigation system 18 are connected to the control circuit 20 so as to be communicable with each other.

An inter-vehicle communication system is made up of a plurality of the communication apparatuses 1.

[Configuration of the Receiver Circuit 10]

The receiver circuit 10 serves as a circuit for receiving a radio wave transmitted from other communication apparatus 1 mounted in a nearby traveling vehicle. The receiver circuit 10 is incorporated with a switching circuit (not shown) for switching the wavelength of the received radio wave. Also, the receiver circuit 10 converts the received radio wave into packets. An antenna 11 is connected to the receiver circuit 10.

[Configuration of the Transmitter Circuit 12]

The transmitter circuit 12 serves as a circuit for transmitting a radio wave to other communication apparatus 1 mounted in a nearby traveling vehicle. The transmitter circuit 12 converts the packets transmitted from the control circuit 20 into a radio wave. The transmitter circuit 12 is incorporated with a switching circuit (not shown) for switching the wavelength of the radio wave to be transmitted. An antenna 13 is connected to the transmitter circuit 12.

It should be appreciated that the receiver circuit 10 and the transmitter circuit 12 correspond to the communicating means.

[Configuration of the GPS Receiver 14]

The GPS receiver 14 is a machine having a function of detecting a vehicle location based on a radio wave from a satellite. An antenna 15 is connected the GPS receiver 14.

[Configuration of the Interface 16]

The vehicle interface 16 is connected to other external machines or the like provided to the vehicle, and has a function of inputting/outputting information from/to these other external machines. The external machines connected with the vehicle interface 16 include, for example, several types of ECUs (electronic control units) (not shown). In this way, the vehicle interface 16 can communicate with the several types of ECUs through an in-vehicle LAN.

[Configuration of the Navigation System 18]

The navigation system 18 is mainly made up of an HDD or the like, in which a map database is recorded. The navigation system 18 calculates the vehicle location of its own based on signals outputted from the GPS receiver 14 and outputs information related to the traveling road of the vehicle to the control circuit 20 at a predetermined interval. In the present embodiment, the navigation system 18 outputs the information related to the traveling road of the vehicle to the control circuit 20 at an interval of about one second.

[Configuration of the Control Circuit 20]

The control circuit 20 is mainly made up of a known microcomputer including a CPU, an ROM, an RAM, an I/O and a bus line connecting these elements, and carries out various processes based on the programs stored in the ROM and the RAM. The RAM is constituted of a nonvolatile memory and utilized for storing various types of data.

The control circuit 20 has a function of controlling the transmitter circuit 12 to transmit various types of information to other communication apparatus 1, in the form of one or more packets at predetermined transmission timing. The control circuit 20 also has a function of referring to the contents of the storage of the incorporated RAM to determine the wavelength of the radio wave transmitted by the transmission circuit 12. In the present embodiment, a transmission frame sectioned for every predetermined transmission period is structured by one or more small periods (see FIGS. 6A to 6C). The transmission timing mentioned above is set within a selected one of the small periods structuring the transmission frame.

The control circuit 20 also has a function of controlling the receiver circuit 10 to receive the same various types of information transmitted from other communication apparatus 1, in the form of one or more packets. Further, when the radio wave transmitted from other communication apparatus 1 is received by the receiver circuit 10, the control circuit 20 functions by reconstructing data based on the received signals that have been outputted from the receiver circuit 10. If the received packets are addressed to another communication apparatus 1, the control circuit 20 controls the transmitter circuit 12 to transmit the packets with the predetermined transmission timing.

Figure 3B:
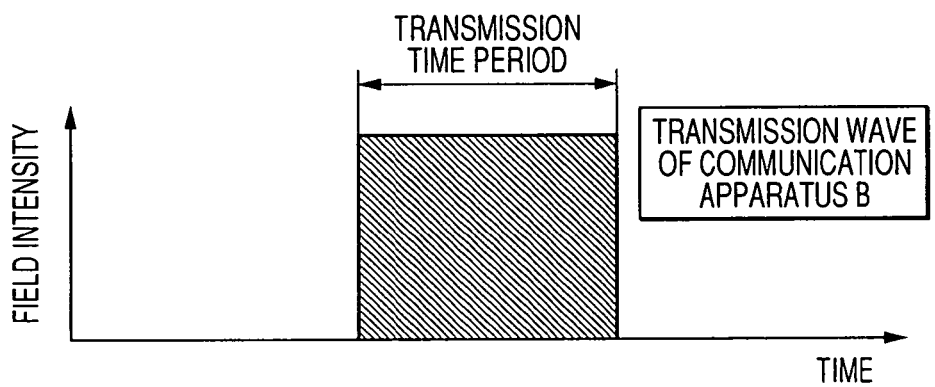
FIG. 3B is a diagrammatic illustration showing a transmission wave of the communication apparatus B.
Figure 3C:
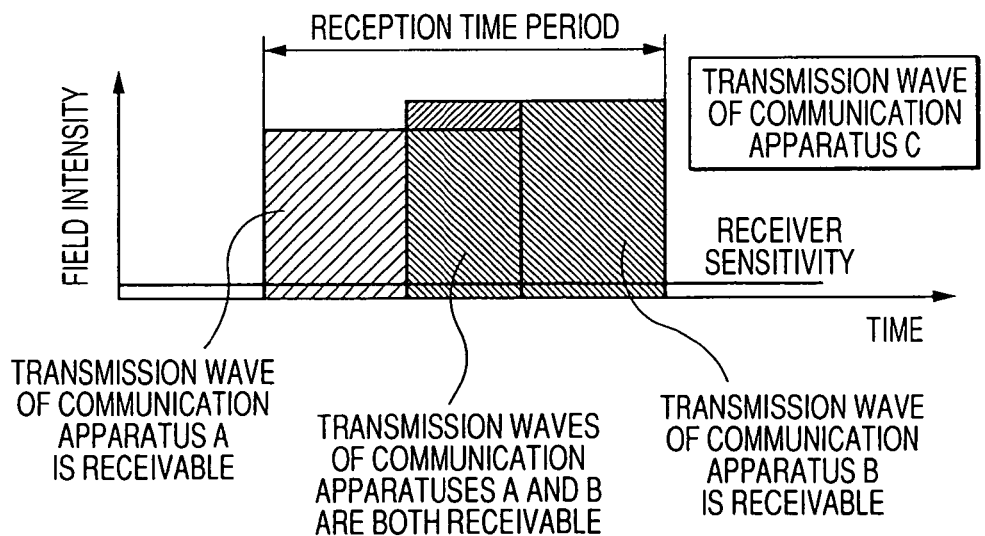
FIG. 3C is a diagrammatic illustration showing a reception wave of the communication apparatus C.

The control circuit 20 also has a function of determining the occurrence of collision of the packets with other packets, which have been received by the receiver circuit 10. Specifically, the receiver circuit 10 receives those packets, first, having a reception power level equal to or more than a set value among the packets transmitted from other communication apparatus. When the reception time period of the receiver circuit 10 is longer than the time period required for receiving a packet having a predetermined packet length, the control circuit 20 determines the received packet as having collided with other packet (see FIGS. 3A to 3C).

Taking an example, as shown in FIGS. 2A and 2B, each communication apparatus becomes communicable with other communication apparatuses when the latter are located in a communication area of the former. The following description is focused on a case where a transmission wave of a communication apparatus A to (see FIG. 3A) and a transmission wave of a communication apparatus B (see FIG. 3B) are received by a communication apparatus C.

When the difference between the field intensities of the transmission waves of the communication apparatuses A and B is small (see FIG. 3C), the communication apparatus C cannot appropriately receive any of the transmission waves of the communication apparatuses A and B, even when the field intensities of both of the communication apparatuses A and B may go beyond a predetermined receiver sensitivity. In this case, the control circuit 20 determines that the packet received by the receiver circuit 10 has collided with other packet.

Figure 4A:
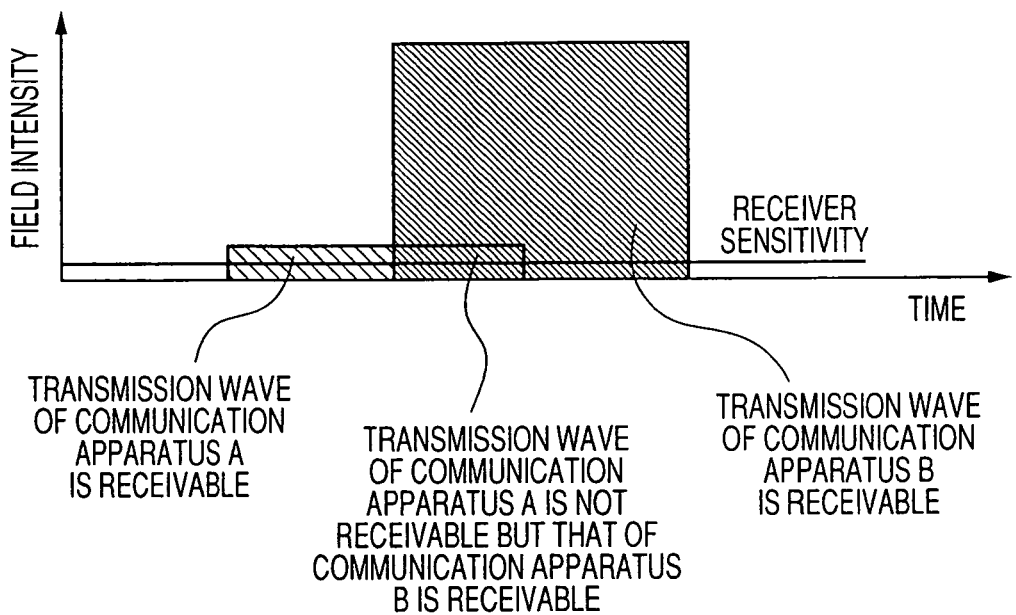
FIGS. 4A and 4B are diagrammatic illustrations each showing a reception wave of the communication apparatus C.
Figure 4B:
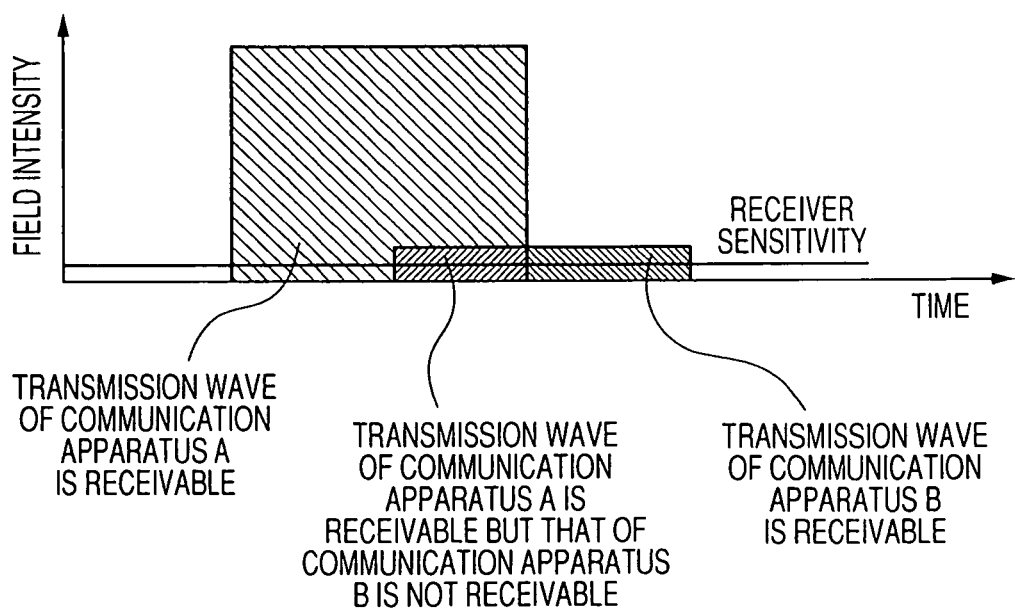

On the other hand, in case the transmission waves of the communication apparatuses A and B are received by the communication apparatus C, and also in case the difference between the field intensities of the transmission waves of the communication apparatuses A and B is large (see FIGS. 4A and 4B), the communication apparatus C can appropriately receive either one of the transmission waves of the communication apparatuses A and B, whichever is larger in the field intensity of the transmission wave. In this case, the control circuit 20 determines that the packet received by the receiver circuit 10 has not collided with other packet. It should be appreciated that the "field intensity" mentioned above corresponds to the "reception power level equal to or more than a set value" mentioned above.

The control circuit 20, when it determines the packet received by the receiver circuit 10 as having collided with other packet, imparts the received packet with "collision detection information" indicating the occurrence of the collision (see FIG. 1B). The packet imparted with the "collision detection information" is transmitted to other communication apparatus 1 under the control of the transmitter circuit 12. In the present embodiment, the slot number allotted to the communication apparatus 1 and used for periodic transmission is used as the "collision detection information".

Further, the control circuit 20 has a function of referring to ID information (which will be explained later) contained in the packets received by the receiver circuit 10 to calculate the number of nearby vehicles. The control circuit 20 further executes a communication control routine, which will be described later.

It should be appreciated that the control circuit 20 corresponds to the communication controlling means, the collision determining means. Also the control circuit 20 has a function for counting number of near by vehicles surrounding vehicle concerned and determining whether or not the number is equal or more than a predetermined value, this function corresponds to a quantity calculate means and a quantity determining means. Further, the control circuit 20 includes an adding means which is configured to adds information indicating a transmission time into the packets being sent out.

[Data Structure of a Packet]

An explanation on a packet will be provided below, which packet is transmitted/received between the communication apparatuses 1. As shown in FIG. 1B, a packet consists of: a header, such as a preamble and a flag indicating a top of the packet; ID information for identifying the vehicle; location information for indicating a location of the vehicle; vehicle information indicating traveling conditions, such as speed or acceleration; collision detection information for notifying the occurrence of collision with a packet from other vehicle; transmission time information indicating a time point of transmission of the subsequent packet; other information used in other applications; and a footer, such as a flag and a postamble indicating the end of the packet.

From the viewpoint of privacy protection, the "ID information" is not for specifying a vehicle, per se. It is preferable, however, that the "ID information" can clearly define a vehicle. The "ID information" is utilized, for example, in tracing a movement trajectory of a vehicle concerned, or in estimating the location of a vehicle concerned based on the vehicle information when communication with the vehicle is lost because of shielding or the like, or in designating a vehicle to communicate with when making one-to-one inter-vehicle communication with the vehicle.

The "vehicle information" refers to the information on the vehicle loading the communication apparatus 1 that has transmitted the packets. The vehicle information includes a travel direction, speed and acceleration of the vehicle except the location of the vehicle. The vehicle location is based on the longitude and latitude information obtained from GPS measurement, for example. The resolution depends on the accuracy of the measurement. With the expectation in the improvement of the technique of measurement in the future, the resolution is preferably on the order of $1/100$ seconds, which corresponds to approximately 1 meter that can specify a driving lane. As far as the urban expressways or the like are concerned, altitude information may be useful to define them from elevated roads.

The location of a vehicle in travel constantly changes. The change is not necessarily in harmonization with the measurement period of the GPS. Accordingly, the location is compensated based, for example, on a travel distance after the measurement and transmitted with the addition of time. The time should be synchronized between all the vehicles with high accuracy. To this end, a GPS clock (i.e. the clock compensated by a GPS because the time of the GPS cannot be known directly) may be used. Alternatively, relative time may be used rather than the absolute time as obtained from the GPS clock. For example, it may be satisfactory to indicate a time period ($\mu$s) before the transmission of the packet to define a time point of the calculation. In this way, use of a reception time point as a reference can disregard the time error between vehicles. Under the changing circumstances, communication failure may be caused being screened by a truck or the like. On such an occasion, the past vehicle information, such as speed, travel direction and acceleration may be used other than the location information to estimate the location of a nearby vehicle.

The "collision detection information" refers to the information imparted to a packet when the packet is determined as having collided with other packet by the communication apparatus 1 which has relayed the packet. When the packet has not collided with other packet, no "collision detection information" is imparted to the packet. The collision detection information includes a number indicating a preceding $n^{th}$ slot that has collided, i.e. the slot number, a time point of detection, and a time period from the detection of the collision to the transmission of the packet. That is, the "collision detection information" provides information for specifying the communication packet with which the collision has occurred.

The "transmission time information" refers to the information indicating a time point of transmission, when the packet has been originally transmitted from the communication apparatus 1.

Further, the impartment of the subsequent transmission time point or the impartment of the time period required before the subsequent transmission may allow the communication apparatuses of the nearby vehicles to know the subsequent transmission timing, whereby collision can be avoided in advance.

The "other information" refers to the information other than the various types of information mentioned above. The "footer" refers to the information on the packet, per se, that is added to the very end of the packet.

Further, for example, in changing the transmission period according to the vehicle speed, the transmission period is shortened in high-speed traveling and lengthened in low-speed traveling. There may be a case, however, where a vehicle approaches at high speed from behind a vehicle which is traveling at low speed or in a stopped state being caught in a traffic jam (hereinafter referred to as a traffic-jam vehicle). In this case, although the traffic-jam vehicle can discover the approaching vehicle, there may be a delay for the approaching vehicle to discover this traffic-jam vehicle because of the long transmission period of the traffic-jam vehicle. To cope with this, upon discovery of a vehicle that approaches at high speed from behind the traffic-jam vehicle, the traffic-jam vehicle can transmit packets at a short period to notify the approaching vehicle of the presence of the traffic-jam vehicle. In a traffic jam, a number of cars in a communication area may all transmit packets at a short period to cause possible shortage in the slots. In such a case, only the vehicle which is determined to be located at the rearmost or proximate to the rearmost position may be ensured to transmit communication packets at a short period. In this way, the communication density may not become high, so that the location information can be notified safely.

[Communication Control Routine]

Referring now to the flow diagram shown in FIG. 5 and the timing diagrams shown in FIGS. 6A to 6C, hereinafter will be described a communication control routine executed by the control circuit 20 of the communication apparatus 1. The timing diagrams shown in FIGS. 6A to 6C explain the communication control routine executed by the control circuit 20 of the communication apparatus 1.

This routine is carried out when the ignition key is operated by a driver to supply electric power to the accessories (ACC) and to start the engine. All the transmission is intended to be performed voluntarily.

First, packets transmitted from outside are received for a predetermined time period through the antenna 11 under the control of the receiver circuit 10 (step S105). In this case, a timer is set according to the number of nearby vehicles so that transmission can be started. Until the transmission is started, the state of receiving packets is continued. Also, until the transmission is started, calculation of the vehicle location, measurement of the vehicle speed and checking on the occurrence of collision, for example, are carried out.

Subsequently, it is determined whether or not vehicles are present nearby (step S110). In particular, the receiver circuit 10 refers to the "ID information" contained in the packets to calculate the number of nearby vehicles and determines as to the presence of nearby vehicles based on the results of the calculation. If nearby vehicles are determined as not being present (NO at step S110), a transmission frame sectioned for every predetermined transmission period is set so as to be made up of a single small period (see FIG. 6A). Then, the transmission timing of the packets is changed on a random basis within the small period that has been utilized in preceding transmission of the packets (step S150 for wide-range random change shown in FIG. 6A). As an example, if a communication packet from other vehicle is received or the collision information is received within the same small period, the transmission timing is ensured to be transferred to an empty portion of the small period. Thus, in performing the wide-range random transmission, setting the transmission timing with a deviation from a variation range where collision occurs in a certain probability, may avoid the collision between vehicles whose location is known.

The time spent at the transmission timing is much shorter than the transmission period, and the period except the time spent at the transmission timing is used of receiving communication packets. The ratio of the time spent for the transmission timing and the reception period depends, for example, on an assumed communication range, the number of vehicles present within the range and a transmission period. In the present embodiment, the time spent for the transmission timing is $1/100$ to $1/1000$ seconds. In other words, it is possible to transmit information on 100 to 1000 vehicles. If communication is received from other vehicle in this reception period, control is transferred to one which is effected for the case where the number of vehicles is small. Varying the transmission timing within the wide range is purposed to reduce the possibility of occurring collision between packets when being approached by other vehicles. In case where periodic transmission is performed and where other vehicles also perform transmission of the same timing, collision between packets may occur to disable detection of other vehicles. However, deviation of the timing may reduce the probability of occurring consecutive collisions between packets, so that the presence of the communication apparatuses concerned may be detected.

On the other hand, if nearby vehicles are determined as being present (YES at step S110), it is then determined whether or not the number of the nearby vehicles is equal to or more than a predetermined number (step S115). In the present embodiment, the predetermined number is set at "10". When the number of the nearby vehicles is determined not exceeding the predetermined number (NO at step S115), the number of the nearby vehicles is regarded as being small. Then, the transmission frame sectioned for every predetermined period is set so as to be made up of a plurality of small periods. Also, a determination is made whether or not collision between packets has occurred (step S120). In particular, when the receiver circuit 10 requires longer time period in receiving a packet transmitted from other communication apparatus 1 than the time period in receiving a packet of a predetermined packet length, the received packet is determined as having collided with other packet. If the packet is determined as having collided with other packet (YES at step S120), the transmission timing within the small period is changed on a random basis. At the same time, the small period used for packet transmission is changed on a random basis (narrow-range random change at step S155).

As an example, the small period for packet transmission used by the communication apparatus A is changed from the second small period to the third small period, and the transmission timing within a small period is randomly changed (see FIG. 6B). Also, the slot for packet transmission used by the communication apparatus B is changed from the second small period to the fifth small period, and the transmission timing within a small period is randomly changed (see FIG. 6B).

The reason why the transmission timing is changed within a small period is that the number of vehicles within a communication area may often be small with the vehicles being distanced from each other, and that the occurrence of collision may not be detected/notified by other vehicles. The length of each small period is changed according to the number of the nearby vehicles. In the present embodiment, a transmission frame consists of six small periods (see FIG. 6B). When the number of the nearby vehicles is small, the length of each small period can be made large, and when the number of the nearby vehicles is large, the length of each small period can be made small. It is preferable that the usage rate of a small period (rate of actual communication in a small period) is set at 50% or less. This is because the individual vehicles move asynchronously and the small periods are deviated between vehicles, and thus because use of the adjacent small periods may raise the probability of collision. In order to prevent this, a variation range is required to be made smaller, which is achieved by providing a setting in which every other small period is ensured to be used.

On the other hand, if the number of the nearby vehicles is determined as being small and no collision between packets is determined as having occurred (NO at step S120), the transmission timing within a small period is randomly changed (narrow-range random to change at step S125). As an example, when the communication apparatus C transmits a packet, the fourth small period is kept used and the transmission timing is randomly changed within the small period (see FIG. 6B).

If the number of the nearby vehicles is determined as being equal to or more than the predetermined number (YES at step S115), the number of the nearby vehicles is regarded as being large, and the transmission frame sectioned for every predetermined transmission period is set so as to be made up of a single small period (see FIG. 6C). Further, it is determined whether or not the previously received packet has been involved in a collision (step S160). If it is determined that no collision between packets has occurred (NO at step S160), the transmission timing within a small period is kept to be constant, whereby the transmission interval of packets is kept to be constant (setting of fixed value at step S165, which is shown at the communication apparatus B of FIG. 6B). On the other hand, if the packet is determined as having been collided (YES at step S160), the transmission timing within the small period is randomly changed (change of fixed value at step S170). As an example, in the transmission of packets by the communication apparatuses A and C, the transmission timing is randomly changed within the transmission frame (small period) (see FIG. 6C).

The reason for this is provided below. Specifically, a larger number of the nearby vehicles may raise the probability of detecting collision, which no longer necessitate variation of the transmission timing. Contrarily, decrease in the interval of transmission for other vehicles may resultantly cause variation in the transmission timing, by which the probability of collision may be raised. Therefore, the transmission timing is fixed and control is affected in such a way that the transmission timing is shifted to a larger transmission interval if collision notification is received or the interval of transmission for other vehicles has become smaller.

Collision of packets may occur not only when a vehicle newly enters into the communication area, but also when vehicles are in a stopped state being caught in a traffic jam. This is caused by the error of the timer possessed by each vehicle. Generally, the accuracy of an oscillator used in a communication apparatus for vehicle, for example, is of a degree ranging from 10 to 100 PPM. Error of 0.6 to 6 milliseconds is caused per minute, which may allow the transmission timings that have been apart from each other to become gradually close to each other. This may be avoided in advance by having the transmission timing shifted to a larger transmission interval when the transmission interval has become smaller exceeding a certain level.

Subsequently, after changing or setting the transmission time as described above, the receiver circuit 10 is controlled to receive packets from outside through the antenna 11 (step S130). Then, it is determined whether or not the received packets each contain the information indicative of the transmission time points (step S135). If a received packet is determined as not containing the information indicative of the transmission time point (NO at step S135), control returns to the previous step S130. Meanwhile, a received packet is determined as containing the information indicative of the transmission time point (YES at step S135), the transmitter circuit 12 is controlled to transmit the packet at the transmission timing previously determined (step S140).

Then, it is determined whether or not the engine has stopped (step S145). If the engine is determined as not having stopped (NO at step S145), control returns to the previous step S110. Meanwhile, if the engine is determined as having stopped (YES at step S145), the current routine comes to an end.

Advantages of the Embodiment (1) As described above, in the communication apparatus 1 according to the present embodiment, when normal reception has not been achieved by other inter-vehicle transmission apparatus 1 in the course of the inter-vehicle communication in spite of the fact that the packet has sufficient reception power level, collision between packets is estimated as having occurred.

The control circuit 20 can readily determine collision between packets as having occurred in case where the time period required for the receiver circuit 10 to receive a packet having a reception power level of equal to or more than a set value, is longer than the time period required for the receiver circuit 10 to receive a packet having a predetermined packet length.

(2) In the communication apparatus 1 according to the embodiment, the control circuit 20 may determine that a packet received by the receiver circuit 10 has collided with other packet. In this case, the "collision detection information" indicative of the occurrence of collision is imparted to the received packet. Then the packet imparted with the "collision detection information" is transmitted to other communication apparatus 1 under the control of the transmitter circuit 12. Thus, in a one-way communication mode where there is no response (ACK) indicative of normal reception, the communication apparatus 1 which has transmitted the packet in question may detect the fact of collision after transmission by confirming the presence of the "collision detecting information" imparted to the returned packet that the apparatus, per se, has transmitted.

(3) In the communication apparatus 1 according to the embodiment, the slot number for periodic transmission, which is allotted to the communication apparatus 1, is used as the "collision detection information". Thus, by confirming the impartment of the slot number of its own, the packet transmitted by the apparatus, per se, can be readily determined as having collided. The position of a slot can be specified by using a corresponding bit position, which may readily enable notification of collision of as to a plurality of packets. Also, the position of such a slot may be specified by notifying the position of collision of the packet, or by notifying the positions of normal reception of the packets. The former is effective in case the packet is received and the packet has collided with other packet, and the latter is effective in case detection of the collided packet is difficult. One of the merits for using the slot number is that it enables the notification of collision between packets with a relatively small amount of data, however, the number of collisions to be notified in one transmission is limited. In contrast, use of the corresponding bit positions require a comparatively large amount of data, however, there is a merit of not limiting the number of collisions to be notified.

(4) In the communication apparatus 1 according to the embodiment, the control circuit 20 executes the processes as provided at items (4-1) to (4-4) below in the course of the communication control routine described above, according to the number of nearby vehicles.

(4-1) If the number of the nearby vehicles is small (NO at step S115) and the packet of interest has collided with other packet (YES at step S120), the transmission frame sectioned for every predetermined transmission period is set so as to be made up of six small periods (see FIG. 6B), and the transmission timing is changed within a small period, while randomly changing a small period used for the packet transmission (step S155).

(4-2) If the number of the nearby vehicles is small (NO at step S115) and the packet of interest has not collided with other packet (NO at step S120), the transmission frame sectioned for every predetermined transmission period is set so as to be made up of six small periods (see FIG. 6B), and the transmission timing is randomly changed within a small period (step S125).

(4-3) If the number of the nearby vehicles is large (YES at step S115) and the packet of interest has not collided with other packet (NO at step S160), the transmission frame sectioned for every predetermined transmission period is set so as to be made up of a single small period (see FIG. 6C), and the transmission timing within a small period is kept to be constant to keep the transmission interval of packets to be constant (step S165).

(4-4) If the number of the nearby vehicles is large (YES at step S115), and the packet of interest has collided with other packet (YES at step S160), the transmission frame sectioned for every predetermined transmission period is set so as to be made up of a single small period (see FIG. 6C), and the transmission timing is randomly changed within a small period (step S170).

In this way, consecutive collision of packets can be avoided in a situation where the number of the nearby vehicles is small and where there is no nearby vehicle for detecting collision of packets. Contrarily, when the number of the nearby vehicles is large, a slot may be fixed to reduce the probability of occurring collision.

(5) In the communication apparatus 1 according to the embodiment, the number of the small periods structuring the transmission frame can be changed in the communication control routine described above, according to the number of the nearby vehicles, so that the variation range of transmission interval can be changed. Thus, the probability of occurring collision between transmitted packets is reduced, whereby collision between packets can be avoided in advance.

(Modifications)

An embodiment of the present invention has been described above. The present invention however is not limited to the embodiment described above, but can be implemented in various modes as provided below.

(Modification 1)

In the communication apparatus 1 according to the embodiment described above, the control circuit 20 has determined that a received packet has collided with other packet in case the time period required for the receiver circuit 10 to receive a packet having a reception power level of equal to or more than a set value, is longer than the time period for receiving a packet having a predetermined packet length. Alternative to this, other schemes may be used to determine the occurrence of collision between packets.

(1-1) For example, when normal reception cannot be attained in spite of the fact that the packet of interest has a sufficient reception power level, the packet can be determined as having collided with another packet. This is because a reception error may be brought about by other causes, such as multipath, than the collision between packets.

(1-2) Further, when a vehicle has been confirmed, during the communication up to then, as being located within a sufficiently communicable range, but no further reception of data from the vehicle can be achieved, the received packet may be determined as having collided with another packet. This is because there may be a case where radio waves cannot be received due to being screened by a truck or the like.

(Modification 2)

In the communication apparatus according to the embodiment described above, when a packet received by the receiver circuit 10 is determined as having collided with other packet, the control circuit 20 has imparted the information indicating accordingly, i.e. the "collision detection information", to the packet to be transmitted. Then, the packet imparted with the "collision detection information" has been transmitted to other communication apparatus 1 under the control of the transmitter circuit 12.

Alternatively, however, when a packet received by the receiver circuit 10 is determined as having collided with another packet, the control circuit 20 may generate the "collision detection information" in the form of a new packet, and the generated packet may be transmitted to the other communication apparatus 1 under the control of the transmitter circuit 12. A one-way communication mode where there is no response (ACK) indicative of normal reception, such a configuration may allow the inter-vehicle communication 1 that has transmitted a packet to receive a packet generated by other communication apparatus 1 at the time of occurring collision. Thus, possible collision of a packet transmitted by an inter-vehicle apparatus 1 can be detected by the apparatus, per se.

(Modification 3)

In the communication apparatus according to the embodiment described above, the slot number used for periodic transmission, which is allotted to the communication apparatus 1, has been used as the "collision detection information". Alternatively, other information may be used as the information indicative of collision between packets.

(3-1) For example, the information indicating the time the collision has occurred between the packet of interest and other packet, may be used as the information indicating collision between packets. Thus, the determination based on the time common to the individual communication apparatuses mounted in the individual vehicles may allow no erroneous determination as to the occurrence of collision of the packet transmitted by the communication apparatus, per se.

(3-2) The information indicating elapsed time from a reference time period may be used as the information indicating collision between packets. Thus, a determination can be made as to the occurrence of the packet transmitted by the communication apparatus, per se, without the need for compensating the clock of the individual communication apparatuses mounted in the individual vehicles with correct time.

(3-3) The information indicating elapsed time from a preset reference time point to a time point when collision has occurred between the packet of interest and other packet, may be used as the information indicating collision between packets. The "reference time point" mentioned above refers to the time point when the packet determined as having collided with other packet has been transmitted from an original communication apparatus 1. Thus, only going back from the time point of receiving the packet informing of the collision will suffice, without the need for correcting the clock.

(3-4) A numeral "0" or "1" at a bit position corresponding to a slot may be used as the information indicating the occurrence of collision between packets.

(Modification 4)

In the communication control routine described above, the control circuit 20 may be adapted to impart a packet to be transmitted with the "transmission time information" indicating a time point of subsequent transmission of a packet, at steps S155 and S170. Then, the packet imparted with the "transmission time information" may be transmitted at a time point other than the time point indicated by the "transmission time information" contained in the packet from other communication apparatus 1, which packet has been received by the receiver circuit 10, under the control of the transmitter circuit 12 (see FIG. 6B). Thus, an estimated time point of the subsequent transmission of a packet can be imparted to the packet. A communication apparatus that has received the transmission in question can refer to the information imparted to the received packet, and can transmit a packet at a time point other than the estimated time point when the original communication apparatus 1 will make the subsequent transmission. In this way, collision between packets can be avoided in advance.

(Modification 5)

The control circuit 20 of a vehicle may be adapted to estimate the current location of a nearby vehicle loading a communication apparatus, based on the "vehicle information" imparted to a packet which has been transmitted by the apparatus mounted in the nearby vehicle and received by the receiver circuit 10 of the vehicle of its own. In particular, when the control circuit 20 transmits a packet under the control of the communicating means, the "vehicle information" obtained through the vehicle interface 16 may be imparted to the packet. The packet imparted with the "vehicle information" is transmitted under the control of the transmission circuit 12. After that, if it is determined that the packet received by the receiver circuit 10 has collided with other packet, the control circuit 20 can estimate the current location of the nearby vehicle loading the communication apparatus that has transmitted the received packet, based on the "vehicle information" imparted to the received packet.

To this end, the control circuit 20 may have the following functions. Specifically, the control circuit 20 may have a function of obtaining the "vehicle information" of its own through the vehicle interface 16. Particular examples of the "vehicle information" include a travel direction, speed and acceleration of the vehicle. The control circuit 20 also may have a function of estimating the current location of the nearby vehicle loading a communication apparatus that has transmitted a packet received by the receiver circuit 10, based on the "vehicle information" imparted to the received packet. It should be appreciated that the control circuit 20 and the vehicle interface 16 correspond to the vehicle information acquisition means, and that the control circuit 20 corresponds to the current location estimating means.

In this way, if no information is transmitted from each of the other communication apparatuses to indicate its current location, as in the case where the communication apparatuses are in a tunnel, for example, where communication with the GPS is difficult, the current location of each communication apparatus can be correctly estimated based on the "vehicle information" instead of the location information obtained through the GPS.

(Modification 6)

In randomly changing the transmission interval when the number of nearby vehicles is small, the control circuit 20 may set its variation range of the transmission interval so as to be different from the variation range of the control circuit 20 in each of other communication apparatuses. Specifically, in the communication control routine described above, the transmission timing within a small period may be randomly changed by the control circuit 20 irrespective of the possible occurrence of collision between packets, if the number of the nearby vehicles are determined as being small (NO at step S120).

In this case, however, the variation range of the transmission interval for packets should be set so as not to overlap with the variation range of the communication apparatus indicated by the information imparted to the received packet. The transmission interval may be randomly changed within the set variation range. In this case, it is necessary to exchange communication on transmission interval, by having the control circuit 20 imparted "variation range information" to a packet, the information indicating its allowable variation range of packet transmission interval, and by transmitting the packet imparted with the "variation range information" to each of other communication apparatuses at a suitable transmission interval under the control of the transmitter circuit 12.

In this way, since the control circuit 20 can set the variation range of its transmission interval so as to be different from those of other communication apparatuses, collision between packets can be avoided in advance even when a plurality of communication apparatuses 1 should transmit packets at substantially the same time point.

(Modification 7)

As a scheme for avoiding collision between packets described above, the intervals of packet transmission by the individual communication apparatuses 1 may be uniformly distributed. Specifically, regarding the intervals for transmitting packets under the control of the transmitter circuit 12, the control circuit 20 may refer to the transmission interval of the communication apparatus 1 indicated by the information imparted to the received packet. Thus, the control circuit 20 may set the transmission intervals for the individual communication apparatuses 1 so as to be uniformly distributed, and impart each packet with the "transmission interval information" indicating the set transmission interval. Each of the packets imparted with the "transmission interval information" may then be transmitted to each communication apparatus at the set transmission interval under the control of the transmitter circuit 12.

In this way, since the packet transmission intervals of the individual communication apparatuses 1 are uniformly distributed, collision between packets can be avoided in advance even when a plurality of communication apparatuses 1 should transmit packets at substantially the same time point.

(Modification 8)

Further, when a long transmission interval is set while the vehicle is in a stopped state or traveling at low speed, for example, the transmission interval may be ensured to be reset so as to be shorter when a vehicle approaching from behind at high speed has been detected.

Specifically, the control circuit 20 may detect travel speed of the vehicle of its own through the vehicle interface 16, and may set an interval for transmitting packets in such a way that the higher the detected travel speed is of the vehicle of its own, the shorter the packet transmission interval may become. The control circuit 20 may then impart each packet with the "transmission interval information" indicating the set transmission interval and transmit the packet imparted with the "transmission interval information" to other communication apparatuses 1 under the control of the transmitter circuit 12.

Further, the control circuit 20 may compare the transmission interval of the packets transmitted from the communication apparatus 1 mounted in a vehicle located behind, with its own transmission interval. The transmission interval of the vehicle behind, which is one of the nearby vehicles, is indicated by the information imparted to the packet received by the receiver circuit 10. When the transmission interval of the packets transmitted from the vehicle behind is shorter than that of its own, the control circuit 20 can determine that the vehicle behind is approaching at high speed. When the vehicle behind is determined as approaching at high speed, the control circuit 20 may reset the packet transmission interval so as to be shorter. It should be appreciated that the control circuit 20 and the vehicle interface 16 corresponds to the vehicle speed detecting means, and the control circuit 20 corresponds to the approach conditions determining means.

Thus, where a long transmission interval has been set while the vehicle is in a stopped state or traveling at low speed, if a vehicle approaching from behind at high speed is detected, the transmission interval is reset so as to be shorter. Resetting the transmission interval to be shorter may enable prompt transmission of various types of information to the vehicle approaching from behind or other nearby vehicles.

(Modification 9)

Resetting of the transmission interval to be shorter may be effected to a communication apparatus 1 only when the vehicle of its own is located at the rearmost or near the rearmost position, and the transmission interval for each of the communication apparatuses 1 mounted in other vehicles may be set so as to have a length according to the speed of each vehicle.

Specifically, the control circuit 20 may determine whether the location of the vehicle of its own is located at the rearmost or near the rearmost point of a traffic jam. The traffic jam refers to the conditions where a number of vehicles are densely located within a particular range. When it is determined that a vehicle approaches at high speed from behind, and when it is determined that the vehicle of its own is located near the rearmost point of the traffic jam, the control circuit 20 may reset the transmission interval so as to be shorter. On the other hand, when the vehicle of its own is determined as not being located at the rearmost point, the control circuit 20 may maintain its transmission interval as it is. It should be appreciated that the control circuit 20 corresponds to the traffic jam determining means and resetting means for resetting the transmitting interval.

For example, vehicles, when involved in a traffic jam, are brought into a stopped state or obliged to travel at low speed. Under such circumstances, the communication apparatus mounted in each of all the vehicles involved in the traffic jam is set so as to have a long transmission interval. Upon detection of a vehicle approaching from behind at high speed, the transmission intervals of all the vehicles may sometimes be reset so as to be shorter. In this case, communication congestion may be considered to occur between the communication apparatuses, which may be liable to cause collision between packets. According to the embodiment of the present modification, however, no communication congestion may be caused between the communication apparatuses 1, whereby collision between packets can be prevented in advance.

What is claimed is:

1. A communication apparatus mounted in a vehicle and communicable with other communication apparatuses mounted in other vehicles respectively, the communication apparatus comprising:
    a communication unit configured to communicate with the communication apparatuses mounted in the other vehicles by wireless;
    a communication controlling unit configured to control the communication unit to enable the communication unit to send out at least one packet including information to the other communication apparatuses, and to receive packets including information sent out from the other communication apparatuses; and
    a collision determining unit configured to determine whether or not the packets sent from the other communication apparatuses and received by the communication controlling unit have collided with each other; wherein
    the communication controlling unit is configured to control the communication unit to enable the communication unit to send out the at least one packet including information related to a collision of the packets, to the other communication apparatuses, when the collision determining unit determines that the packets have collided with each other;
    the communication controlling unit is configured to use an elapsed time as the information related to the collision, the elapsed time being a period starting from a predetermined reference time point to a time point at which the collision occurred when the collision determining unit determines that the packets have collided with each other.

2. The communication apparatus according to claim 1, wherein the collision determining unit is configured to determine that the packets received by the communication control unit have collided with each other, when a reception time period during which the packets are received exceeds a given reception time period necessary for receiving a given packet of a predetermined bit length.

3. The communication apparatus according to claim 1, wherein the communication controlling unit is configured to control the communication unit to enable the communication unit to send out the at least one packet including information related to a collision of the packets, to the other communication apparatuses, when the collision determining unit determines that the packets have collided with each other, the information being generated by the communication controlling unit.

4. The communication apparatus according to claim wherein the communication controlling unit is configured to use either a slot number that is allotted to the communication apparatus or a bit location corresponding to the slot as the information indicating the collision when the collision determining unit determines that the packets have collided with each other.

5. The communication apparatus according to claim wherein the communication controlling unit is configured to use a time point at which the collision occurred, as the information related to the collision, when the collision determining unit determines that the packets have collided with each other.

6. The communication apparatus according to claim 1, wherein the predetermined reference time point is a time point of a transmission time which is included in the packets being collided.

7. A communication apparatus mounted in a vehicle and communicable with other communication apparatuses mounted in other vehicles respectively, the communication apparatus comprising:
- a communication unit configured to communicate with the communication apparatuses mounted in the other vehicles by wireless;
- a communication controlling unit configured to control the communication unit to enable the communication unit to send out at least one packet including information to the other communication apparatuses, and to receive packets including information sent out from the other communication apparatuses;
- a collision determining unit configured to determine whether or not the packets sent from the other communication apparatuses and received by the communication controlling unit have collided with each other;
- a quantity calculating unit that calculates a number of vehicles that is located surrounding a vehicle concerned; and
- a quantity determining unit that determines whether or not the number of vehicles is equal to or more than a predetermined quantity;
- wherein the communication controlling unit includes means for (i) setting a random value to a transmission interval for the packets being sent in a predetermined variation range of a transmission frame, when the quantity determined unit determines that the number of vehicles is less than the predetermined quantity, (ii) setting a fixed value to the transmission interval, when the quantity determining unit determines that the number of vehicles is equal to or more than the predetermined quantity, and (iii) setting different values to the transmission interval, when the collision determining unit determines the collision during the transmission under the fixed value which is set to the transmission interval.

8. The communication apparatus according to claim 7,
- wherein the communication controlling it includes means for changing a position of the variation range in the transmission frame depending on the number of vehicles determined by the quantity determined unit, and setting the transmission interval within the variation range of which the position of the range is changed.

9. The communication apparatus according to claim 1, comprising a vehicle information acquisition unit that acquires vehicle information indicating data of a vehicle concerned;
- wherein the communication controlling unit is configured to add the vehicle information acquired by the vehicle information acquisition unit into the packets being sent out, and control the communication unit to send out the packets having the vehicle information;
- the apparatus further comprising a current location estimating unit that estimates current locations of the vehicles whose communication apparatuses have sent out the packets to the vehicle concerned, based on the vehicle information in the received packets, when the collision determining unit determines the collision.

10. A communication apparatus mounted in a vehicle and communicable with other communication apparatuses mounted in other vehicles respectively, the communication apparatus comprising:
- a communication unit configured to communicate with the communication apparatuses mounted in the other vehicles by wireless;
- a communication controlling unit configured to control the communication unit to enable the communication unit to send out at least one packet including information to the other communication apparatuses, and to receive packets including information sent out from the other communication apparatuses;
- a collision determining unit configured to determine whether or not the packets sent from the other communication apparatuses and received by the communication controlling unit have collided with each other;
- a quantity calculating unit that calculates a number of vehicles that is located surrounding a vehicle concerned; and
- a quantity determining unit that determines whether or not the number of vehicles is equal to or more than a predetermined quantity;
- wherein the communication controlling unit includes means for (i) setting a variation range of transmission frame where a transmission interval for the packets being sent can vary, to avoid overlapping with a variation range of a transmission frame indicated by information embedded in the received packets, when the number of vehicles determined by the quantity determined unit is less than the predetermined quantity; (ii) setting, at random, the transmission intervals within the variation range of the transmitting frame newly set; (iii) adding information indicating the variation range of the transmission frame into the packets being sent, and (iv) controlling the communication unit to send out the packet including the information about the variation range of the transmission frame to the other communication apparatuses.

* * * * *

UNITED STATES PATENT AND TRADEMARK OFFICE
CERTIFICATE OF CORRECTION

PATENT NO. : 8,451,732 B2
APPLICATION NO. : 12/924482
DATED : May 28, 2013
INVENTOR(S) : Michinaga Nagura It is certified that error appears in the above-identified patent and that said Letters Patent is hereby corrected as shown below:

In the Claims

Col. 18, line 51, Claim 4, delete "claim" and insert --claim 1--;

Col. 18, line 58, Claim 5, delete "claim" and insert --claim 1--;

Col. 19, line 38, Claim 8, delete "it" and insert --unit--.

Signed and Sealed this
Twelfth Day of November, 2013

Teresa Stanek Rea
*Deputy Director of the United States Patent and Trademark Office*